United States Patent [19]

Lindgren et al.

[11] Patent Number: 4,940,503
[45] Date of Patent: Jul. 10, 1990

[54] PROCESS FOR THE PRODUCTION OF AN ABRASION RESISTANT DECORATIVE THERMOSETTING LAMINATE

[75] Inventors: Kent O. Lindgren; Sven E. Danielsson; Tommy M. Johnsson, all of Perstorp; Nils-Joel A. Nilsson, Hässleholm, all of Sweden

[73] Assignee: Prestorp AB, Perstorp, Sweden

[21] Appl. No.: 311,955

[22] Filed: Feb. 17, 1989

[30] Foreign Application Priority Data

Feb. 18, 1988 [SE] Sweden ................... 8800550

[51] Int. Cl.$^5$ ............................. B32B 31/12
[52] U.S. Cl. ................... 156/279; 156/278;
156/324; 156/335; 156/390; 162/184; 427/180;
427/202; 427/204; 427/205; 428/208;
428/904.4; 428/908.8
[58] Field of Search ............... 156/62.2, 279, 390,
156/278, 324, 335; 428/535, 904.4, 908.8, 329,
208; 427/180, 202, 204, 205; 162/186, 184

[56] References Cited

U.S. PATENT DOCUMENTS

| | | | |
|---|---|---|---|
| 2,057,548 | 10/1936 | Wallach et al. | 427/202 X |
| 3,373,071 | 3/1968 | Fuerst | 156/335 X |
| 3,461,032 | 8/1969 | Lichtenberger et al. | 162/186 X |
| 3,798,111 | 3/1974 | Lane et al. | 156/148 X |
| 4,263,031 | 4/1981 | Scher et al. | 156/279 |

FOREIGN PATENT DOCUMENTS

| | | |
|---|---|---|
| 0122396 | 10/1984 | European Pat. Off. |
| 0136577 | 4/1985 | European Pat. Off. |
| 2543197 | 4/1982 | Fed. Rep. of Germany |
| 648979 | 9/1980 | Switzerland |

Primary Examiner—David Simmons
Assistant Examiner—Michele K. Yoder
Attorney, Agent, or Firm—Stevens, Davis, Miller & Mosher

[57] ABSTRACT

This invention relates to a process for the production of a decorative thermosetting laminate with an abrasion-resistant surface layer, which laminate comprises paper sheets impregnated with a thermosetting resin. In the process a continuous paper is impregnated with a noble thermosetting resin such as melamine-formaldehyde resin. At least one side of the paper is coated with 2–20 g/m$^2$, preferably 3–12 g/m$^2$ of small, dry and hard particles evenly distributed over the whole wet surface of the resin on the continuous paper. The resin is dried, whereupon the particle coated impregnated paper, so-called prepreg is possibly cut to sheets. At least one such sheet or continuous paper is placed as a surface layer on a base layer and bonded thereto.

21 Claims, 2 Drawing Sheets

PROCESS FOR THE PRODUCTION OF AN ABRASION RESISTANT DECORATIVE THERMOSETTING LAMINATE

FIELD OF THE INVENTION

The present invention relates to a process for the production of a decorative thermosetting laminate with an abrasion - resistant surface layer.

BACKGROUND OF THE INVENTION

Decorative thermosetting laminates are well-known and used for instance as covering material for walls, cupboard doors, desktops tabletops, for other furniture and as flooring material.

Such laminates are often made of two to seven craft paper sheets impregnated with phenol-formaldehyde resin, a monochromatic or patterned decor paper sheet impregnated with melamine-formaldehyde resin and a fine so-called overlay sheet of α-cellulose impregnated with melamine - formaldehyde resin.

The overlay sheet is intended to protect the decor paper sheet from abrasion. In certain cases the overlay sheet is omitted.

There are also laminates consisting of a base layer of particle board or fibre board provided with such a decor paper sheet and possibly an overlay sheet. These sheets can be laminated towards the base layer under heat and pressure. If a decor paper sheet only is used and no overlay sheet, the decor paper sheet can be glued towards the base layer instead.

The laminates have many good properties. However, it has turned out that there is a great need of improving the abrasion resistance of the laminates exposed to an extreme abrasion. This is especially the case with laminates for floors but to a certain extent also laminates for desktops and tabletops.

It has been tried before to improve the abrasion resistance of these laminates by addition of small, hard particles for instance of aluminum oxide already at the production of the overlay paper of α-cellulose. Then the particles have been spread over a layer of wet α-cellulose fibers on the wire of a paper machine.

With this method, the particles are distributed more or less irregularily within the whole fibre layer. Some of these particles even pass through the wire. Thus, in the overlayer paper obtained the hard particles will be distributed in an uncontrollable way. It is impossible by this known method to get an even distribution of the hard particles on the surface of the paper, where they give the best effect against abrasion.

In other words, the laminates obtained containing such an overlay sheet will get an uneven quality regarding abrasion resistance.

DETAILED DESCRIPTION OF THE INVENTION

Figure 1:
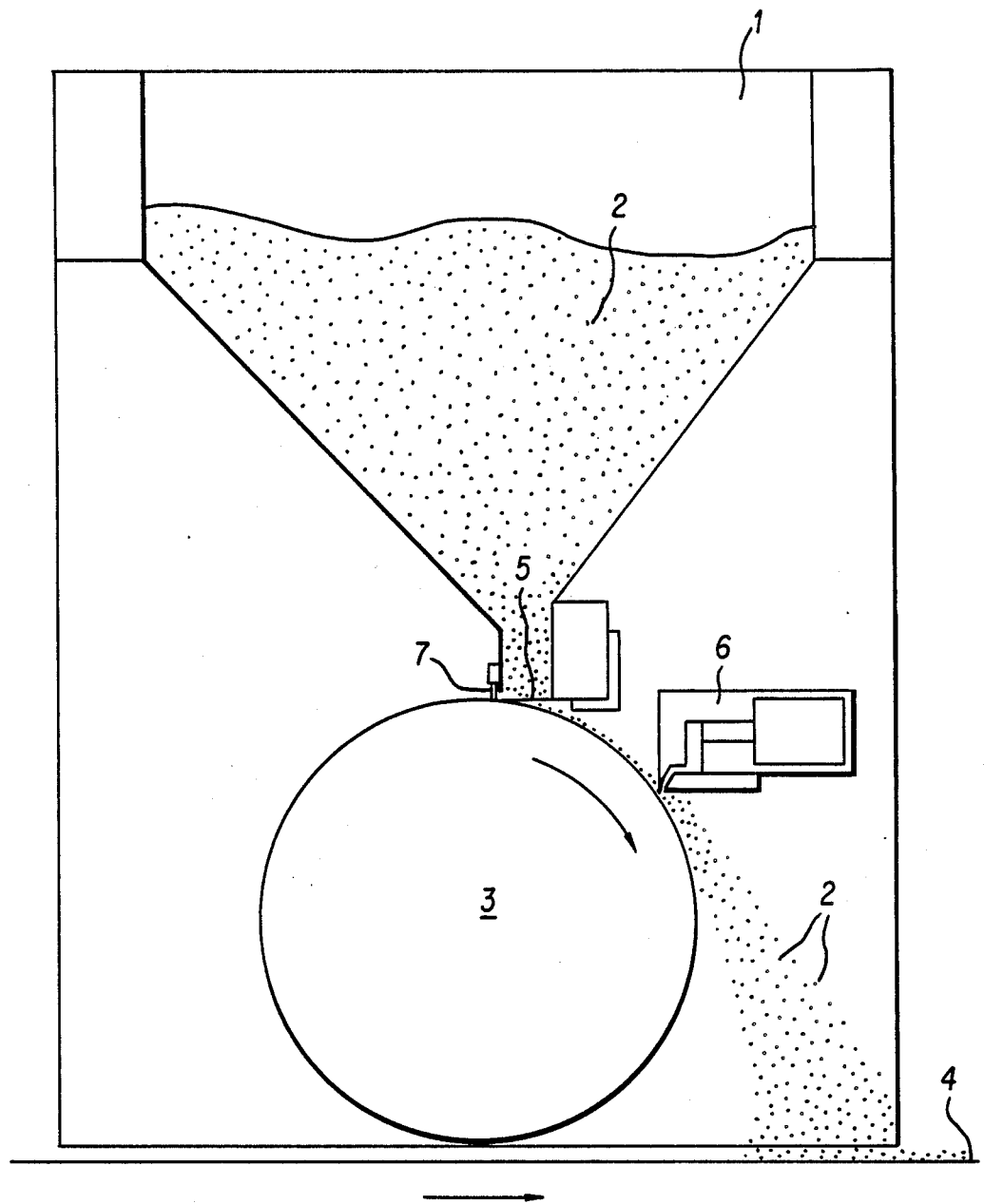

So far it has not been possible to avoid the above mentioned problem in a satisfactory way. However, according to the present invention it has quite unexpectedly been possible to solve the above problem and bring about a process for the production of a decorative thermosetting laminate with an abrasion-resistant surface layer, which laminate comprises paper sheets impregnated with a thermosetting resin. A continuous paper is then impregnated with a thermosetting resin such as melamine-formaldehyde resin. At least one side of the continuous paper is coated with 2-20 g/m$^2$, preferably 3-12 g/m$^2$ of small, dry and hard particles evenly distributed over the whole wet surface of resin on the continuous paper. Thereafter the resin is dried and the particle coated, impregnated paper, so-called prepreg is possibly cut to sheets. At least one such sheet or continuous layer is placed as a surface layer on a base layer and bonded thereto.

The base layer can consist of a plurality of conventional dry prepregs of continuous paper or paper sheets respectively, which are not coated with particles. The resin in the uppermost of these continuous papers or paper sheets possibly consists of a thermosetting resin such as melamine-formaldehyde resin, while the rest of the continuous papers or paper sheets preferably contain a thermosetting resin such as phenol-formaldehyde resin or phenol-urea-formaldehyde resin. The continuous papers or a pile of paper sheets are laminated continuously or discontinuously respectively with the surface layer at a high pressure and an increased temperature.

According to another embodiment of the invention the base layer can consist of particle board or fibre board, whereby the particle coated paper sheet is bonded to the base layer by gluing or laminating under heat and pressure.

The particle coated paper sheet often consists of a so-called overlay paper, preferably of α-cellulose. However, instead it is also possible to apply the hard particles to the so-called decor paper.

Sometimes you can coat both the overlay paper and the decor paper with particles or use two or more such particle coated overlay papers. It is also possible to put a conventional overlay sheet, which is not coated with particles, over the particle coated sheet or sheets.

The particle coated side is suitably directed towards the upper side of the laminate. This is especially true for particle coated decor paper. Such a placing gives the best abrasion resistance.

However the overlay sheets can have the particle coated side directed towards the under side of the laminate. In this way the abrasion of the press plates can be decreased.

When using two particle coated overlay sheets, the uppermost one can have the particle coated side directed towards the under side of the laminate while the particle coated side of the other overlay sheet is directed towards the upper side of the laminate.

According to the invention, it is possible to avoid handling overlay sheets by coating the decor sheet both with hard particles and pulverized α-cellulose impregnated with thermosetting resin such as melamine-formaldehyde resin. The coating can then be applied in one step or in two separate steps. The pulverized α-cellulose will form a protecting layer on top of the decor sheet.

The hard particles can consist of many different materials. It is especially suitable to use silica, aluminum oxide, and/or silicon carbide. Accordingly, a mixture of two or more materials is possible. The size of the particles is important for the final result. If the particles are too big, the surface of the laminate will be rough and unpleasant. On the other hand, too small particles can give too low abrasion resistance. Suitably the average particle size is about 1-80 μm, preferably 5-60 μm.

It is self-evident that the process according to the invention is not restricted to laminates made of paper sheets containing melamine-formaldehyde resin, phenol-formaldehyde resin and phenol-urea-formaldehyde resin. Also other thermosetting resins such as polyester resins are possible.

The invention also relates to a process for the production of a decorative thermosetting resin with an abrasion-resistant surface layer where a special device is used. The device comprises a container containing small hard particles and a rotating doctor-roll with uneven surface placed under the container. The particles are intended to fall down from the container to the doctor-roll and then be distributed evenly on a paper web continuously fed under the doctor-roll. The paper web is impregnated with a thermosetting resin which has not been dried before the application of the particles.

Preferably the device also comprises a scraper plate intended to give an even feeding of particles along the surface of the doctor-roll.

Suitably the device comprises an air knife or the like intended to get the hard particles to come loose from the doctor-roll at a constant amount per unit of time.

Also other devices can be used for application of the hard particles to the wet resin surface on the paper web. For instance electrostatic coating can be used. It is also possible to charge the particles by means of friction and then apply them to the resin surface on the paper web. This charge can be brought about for example by rubbing the particles against a Teflon surface.

EXAMPLES

The invention will be explained further in connection with the embodiment examples below and the enclosed drawings. Example 1 shows production of a conventional decorative thermosetting laminate without any special abrasion preventing additives. According to example 2, a special known overlay paper was used, where small hard particles had been added to the paper fibers already at the production of the paper. Examples 3–16 illustrate a process according to different embodiments of the invention. Example 17 shows an application of pulverized cellulose solely on a decor paper. Finally Example 18 relates to a process according to another embodiment of the invention where hard particles as well as pulverized cellulose are applied to a decor paper.

On the drawing FIG. 1 shows a container 1 containing small, hard particles 2 and a rotating doctor-roll 3 with uneven surface placed under the container 1. The particles are intended to fall down from the container 1 to the doctor-roll 3 and then be evenly distributed on a paper web 4 continuously fed under the doctor-roll 3.

The paper web 4 is impregnated with melamine-formaldehyde resin which has not been dried before the application of the particles.

The paper web 4 is fed at a constant velocity in the direction of the arrow shown on the figure. However, it is also possible to feed the paper web in the other direction instead.

The doctor-roll 3 can be made of different materials, but it is preferable to make it of steel, especially stainless steel. As mentioned above the surface of the doctor-roll 3 should be uneven. This depends on the fact that in this way the hard particles 2 will follow the surface of the doctor-roll 3 in an even layer which is evenly distributed over the paper web 4.

The surface of the doctor-roll can for instance be provided horizontal and/or vertical grooves along the whole length of the roll. The depth of the grooves can be varied. In many cases, however they suitably have a depth of about 10–30 μm.

To facilitate an even distribution of particles 2 on the surface of the doctor-roll 3, the device often comprises a scraper plate 5. Furthermore, the device suitably comprises an air knife or the like 6 too. This is intended to help the hard particles 2 to come loose from, the doctor-roll 3 at a constant amount per unit of time.

The dosing amount can be varied in different ways. For example the rotation velocity of the roll 3 or the velocity of the paper web 4 can be varied. The device can also comprise a tightening brush 7.

Figure 2:
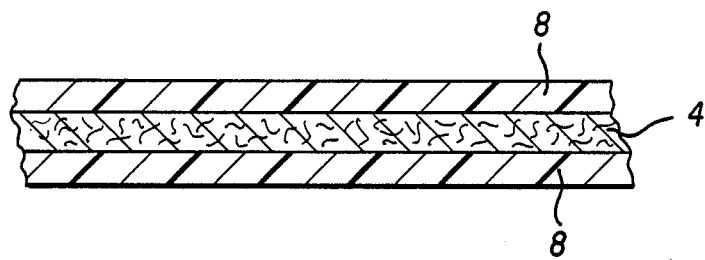

FIG. 2 shows a magnification of a cross-section of the paper web 4, which web is impregnated with thermosetting resin. The resin is wet and has not been coated yet with particles 2. The web has got resin layers 8 on both sides. For elucidation purposes the thickness of the resin layers 8 has been greatly exaggerated compared to the thickness of the web 4.

Figure 3:
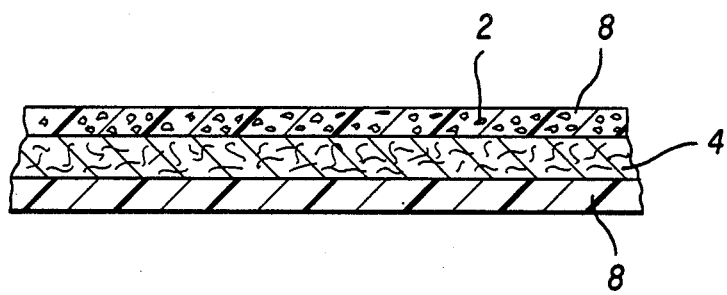

FIG. 3 shows a similar cross-section as FIG. 2. The upper resin layer 8 has however been coated here with small, hard particles 2.

Figure 4:
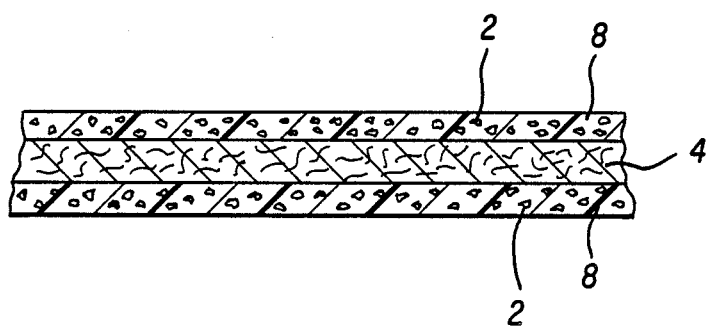

Finally FIG. 4 shows a similar cross-section as in FIG. 2 and FIG. 3. However, here both the upper and the lower resin layer 8 have been coated with small, hard particles 2. For instance this can be brought about with two devices according to the invention, whereby one side is first coated with particles and then the other side.

EXAMPLE 1

A roll of so-called overlay paper of α-cellulose with a surface weight of 40 g/m$^2$ was impregnated with a solution of melamine-formaldehyde resin to a resin content of 70 percent by weight calculated on dry impregnated paper. The impregnated paper web was then fed continuously into a heating oven where the solvent was evaporated. At the same time the resin was partially cured to so-called B-stage. Usually the product obtained is called prepreg.

A roll of so-called decor paper with a surface weight of 80 g/m$^2$ was treated in the same way as the overlay paper. The resin content was 48 percent by weight calculated on dry impregnated paper.

A roll of kraft paper with a surface weight of 170 g/m$^2$ was also treated in the same way with the exception that the resin consisted of phenol-formaldehyde resin instead of melamine-formaldehyde resin. The resin content was 30 percent calculated on dry impregnated paper.

Three of the above prepreg sheets impregnated with phenol-formaldehyde resin (so-called core paper), one decor paper and an overlay paper were placed between two press plates. These sheets were pressed in a conventional multi-opening press at a pressure of 90 kp/cm$^2$ and a temperature of 145° C. to a homogenous decorative laminate.

The abrasion resistance of the laminate obtained was tested according to the ISO-standard 4586/2 -88 by means of an apparatus called Taber Abraser, model 503. According to this standard, the abrasion of the decor layer of the finished laminate is measured in two steps. In step 1, the so-called IP-point (initial point) is measured, where the starting abrasion takes place.

In step 2, the so-called FP-point (final-point) is measured, where 95 % of the decor layer has been abrased.

Moreover, the above ISO-standard stipulates that the number of revolutions obtained with the test machine in step 1 and step 2 are added whereupon the sum obtained is divided with 2. Thereby, the 50 percent point for abrasion is obtained, which is normally reported in standards and off-prints.

However, in the present and the following examples, only the IP-point is used.

At the test of the above laminate, a value of 200 revolutions was obtained for the IP-point, which is normal for a decorative laminate without any reinforcement of the abrasion layer.

EXAMPLE 2

In a paper mill an α-cellulose overlay paper was manufactured with a surface weight of 40 g/m$^2$ by feeding suspended α-cellulose fibers from a head box to the wire of a paper mill. Aluminum oxide particles with an average particle size of about 50 μm were applied to the upper side of the wet fiber layer in an amount of 3 g/m$^2$.

At the subsequent manufacture of the overlay paper, the hard particles were distributed more or less irregularily within the whole paper. Some particles landed close to the surface, some near to the middle and some in the lower part of the paper. Certain particles even passed through the whole fibre layer and out of the wire. Thus, they were not left in the finished paper.

The overlay paper produced was impregnated with the same amount of melamine-formaldehyde resin and thereafter treated also as to the rest in the same way as according to Example 1.

A laminate was produced with the same number of sheets and construction as disclosed in Example 1. The pressing took place under the same conditions too.

The abrasion resistance of the laminate obtained was tested in the same way as according to Example 1. An IP-value of 600 revolutions was obtained.

EXAMPLE 3

The process according to Example 1 was repeated with the difference that immediately after the impregnation; but before the drying, aluminum oxide particles with an average particle size of about 50 μm were applied to the upper side of the paper in an amount of 3 g/m$^2$. At the application of the aluminum oxide particles, an apparatus according to FIG. 1 was used. The revolution velocity of the doctor-roll was 1.5 revolutions per minute.

Thus, the aluminum oxide particles were applied in the melamine-formaldehyde resin, which had not dried yet.

At the subsequent drying, the particles were enclosed in the resin layer and consequently concentrated to the surface of the prepreg produced. The overlay sheet was placed with the particle coated side upwards in relation to the decor paper. The abrasion resistance of the laminate produced was tested in the same way as according to Example 1. An IP-value of 2000 revolutions was measured.

EXAMPLE 4

The process according to Example 3 was repeated with the difference that the amount of aluminum oxide particles was increased from 3 g/m$^2$ to 6 g/m$^2$. The abrasion resistance of the laminate produced was tested in the same way as according to Example 1. An IP-value of 3000 revolutions was measured.

EXAMPLE 5

The process according to Example 3 was repeated with the difference that the amount of aluminum oxide was increased from 3 g/m$^2$ to 8 g/m$^2$. The abrasion resistance of the laminate produced was tested in the same way as according to Example 1. An IP-value of 4000 revolutions was measured.

EXAMPLE 6

The process according to Example 3 was repeated with the difference that the amount of aluminum oxide was increased from 3 g/m$^2$ to 20 g/m$^2$. The abrasion resistance of the laminate produced was tested in the same way as in Example 1. An IP-value of 6000 revolutions was measured.

However, the laminate had a certain haziness which cannot be accepted. Probably the haziness depends on a too high content of aluminum oxide.

EXAMPLE 7

The process according to Example 4 was repeated with the difference that the overlay sheet was placed with the particle coated side downwards facing the decor paper. The abrasion resistance of the laminate produced was tested in the same way as in Example 1. An IP-value of 1200 revolutions was measured.

EXAMPLE 8

The process according to Example 7 was repeated with the difference that two overlay sheets coated with hard particles were used. Both overlay sheets were placed with the particle coated side downwards facing the decor paper. The abrasion resistance of the laminate produced was tested in the same way as in Example 1. An IP-value of 2800 revolutions was measured.

EXAMPLE 9

The process according to Example 4 was repeated with the difference that an overlay sheet with a surface weight of 32 g/m$^2$ was used. The abrasion resistance of the laminate produced was tested in the same way as in Example 1. An IP-value of 2700 revolutions was measured.

EXAMPLE 10

The process according to Example 9 was repeated with the difference that the particle coated side of the overlay sheet was placed downwards facing the decor paper. The abrasion resistance of the laminate produced was tested in the same way as in Example 1. An IP-value of 1100 revolutions was measured.

EXAMPLE 11

The process according to Example 10 was repeated with the difference that two particle coated overlay sheets were used. The two overlay sheets were placed with the particle coated side downwards facing the decor paper. The abrasion resistance of the laminate produced was tested in the same way as in Example 1. An IP-value of 2500 revolutions was measured.

EXAMPLE 12

The process according to Example 9 was repeated with the difference that an overlay sheet with a surface weight of 25 g/m$^2$ was used. The abrasion resistance of the laminate produced was tested in the same way as in Example 1. An IP-value of 2600 revolutions was measured.

EXAMPLE 13

The process according to Example 12 was repeated with the difference that the particle coated side of the overlay sheet was placed downwards facing the decor paper. The abrasion resistance of the laminate produced was tested in the same way as in Example 1. An IP-value of 1000 revolutions was measured.

EXAMPLE 14

The process according to Example 13 was repeated with the difference that two particle coated overlay sheets were used. The two overlay sheets were placed with the particle coated side downwards facing the decor paper. The abrasion resistance of the laminate produced was tested in the same way as in Example 1. An IP-value of 2300 revolutions was measured.

EXAMPLE 15

A patterned decor paper with a surface weight of 80 g/m$^2$ was impregnated with a solution of a quick-curing melamine-formaldehyde resin to a resin content of 66 % by weight calculated on dry impregnated paper.

The impregnated decor paper which had not been dried yet was provided with an even coating of aluminum oxide particles with an average particle size of 30 μm by means of the device shown in FIG. 1. The added amount of particles was 6 g/m$^2$.

The impregnated decor paper coated with aluminum oxide particles was dried in a heating oven in the same way as in Example 1. The paper was dried to a moisture content (volatile) of about 6.5 %. The aluminum oxide particles were now embedded in the resin layer.

A decorative laminate consisting of the thus obtained decor paper as a surface layer and three kraft paper webs with a surface weight of 170 g/m$^2$, impregnated with a quick-curing phenol-formaldehyde resin were continuously pressed in a double band press. The press pressure was 50 bar, the press temperature 175° C. and the press time 20 seconds.

The particle coated side of the decor paper was directed towards the upper side of the laminate. No overlay paper was used. The laminate was tested in the same way as in Example 1. An IP-value of 550 revolutions was measured.

EXAMPLE 16

The process according to Example 15 was repeated with the difference that the amount of aluminum oxide particles added was 13 g/m$^2$. An IP-value of 2900 revolutions was measured.

EXAMPLE 17

A patterned decor paper for decorative laminates, with a surface weight of 80 g/m$^2$ was impregnated with a solution of a melamine-formaldehyde resin to a resin content of 50 % by weight calculated on dry impregnated paper.

The impregnated decor paper which had not been dried was provided with an even coating of dry particles of an unpigmented cellulose material with an average particle size of about 50 μm. The added amount of cellulose particles was 65 g/m$^2$. The particles were applied by the device shown in FIG. 1.

The cellulose material consisted of high-quality, bleached cellulose with a high content of α-cellulose which had been impregnated with a solution of a melamine-formaldehyde resin in a separate process, dried and partially cured to the so-called B-stage of the resin and finally ground to an average particle size of about 50 μm.

The unpigmented cellulose material contained about 70 % by weight of melamine-formaldehyde resin calculated on dry material.

The impregnated decor paper coated with cellulose particles was dried in a heating oven in the same way as in Example 1 to a moisture content (volatile) of 6.5 %. The decor sheet was then placed over three kraft paper sheets impregnated with phenol-formaldehyde resin and pressed to a laminate in the same way as in Example 1. The side of the decor paper coated with cellulose particles was facing upwards in the laminate. No overlay sheet was used.

In the pressed laminate the pattern in the decor sheet could be seen without haziness.

The abrasion resistance was tested in the same way as in Example 1. An IP-value of 300 revolutions was measured.

Thus, the normally used overlay paper can be replaced by a fine powder of cellulose material impregnated with melamine-formaldehyde resin according to the method disclosed above.

Decorative laminates with different level of abrasion resistance can also be produced by the above technique by varying the amount of cellulose particles added.

EXAMPLE 18

The process according to Example 17 was repeated with the difference that cellulose particles impregnated with melamine-formaldehyde resin and aluminum oxide particles with an average particle size of 50 μm where applied. The cellulose particles were applied in an amount of 62 g/m$^2$ and the aluminum oxide particles in an amount of 3 g/m$^2$. An IP-value of 2000 revolutions was measured.

The invention is not limited to the embodiments shown because these can be modified in different ways within the scope of the invention.

We claim:

1. Process for the production of a decorative thermosetting laminate with an abrasion-resistant surface layer, said laminate comprising paper sheets impregnated with a thermosetting resin, said process comprising impregnating a continuous paper with a thermosetting resin, and having the surface of the paper wetted with said resin coating at least one side of the continuous paper with 2-20 g/m$^2$ of small, dry and hard particles so that said particles are evenly distributed over the surface of resin on the continuous paper, then drying the resin with the particle coated thereon, cutting the particle coated impregnated paper into sheets, placing at least one such paper sheet as a surface layer on a base layer and bonding the surface layer to the base layer.

2. Process for the production of a decorative thermosetting laminate with an abrasion-resistant surface, said laminate comprising paper sheets impregnated with a thermosetting resin, said process comprising impregnating a continuous paper with a thermosetting resin, and leaving the surface of the paper wetted with said resin, coating at least one side of the continuous paper with 2-20 g/m$^2$ of small, dry and hard particles so that said particles are evenly distributed over the surface of resin on the continuous paper, then drying the resin with the particles coated thereon, placing at least one such continuous paper as a surface layer on a base layer and bonding the surface layer to the base layer.

3. Process according to claim 1, wherein the base layer consists of a plurality of conventional dry prepreg sheets of paper containing phenol-formaldehyde resin or phenol-urea-formaldehyde resin but not coated with particles, said process comprising laminating a pile of said paper sheets discontinuously with the surface layer under heat and pressure.

4. Process according to claim 3, which comprises placing a paper sheet impregnated with melamine-formaldehyde resin as the uppermost sheet in the pile of sheets forming the base layer.

5. Process according to claim 2, wherein the base layer consists of a plurality of conventional dry prepregs of continuous paper containing phenol-formaldehyde resin or phenol-urea-formaldehyde resin but not coated with particles, said process comprising laminating continuously a plurality of said continuous papers with the surface layer under heat and pressure.

6. Process according to claim 5, which comprises placing a continuous paper impregnated with melamine-formaldehyde resin as the uppermost paper of the plurality of papers forming the base layer.

7. Process according to claim 1, wherein the base layer consists of particle board or fiber board.

8. Process according to claim 1 or 2, wherein the particle coated paper consists of an overlay paper of alpha-cellulose.

9. Process according to claim 1 or 2, wherein the particle coated paper consists of a decor sheet.

10. Process according to claim 7, wherein the particle coated paper is bonded to the base layer by gluing or laminating under heat and pressure.

11. Process according to claim 1 or 2, wherein the hard particles consist of silica, aluminum oxide and/or silicon carbide.

12. Process according to claim 1 or 2, wherein the particles have an average particle size of about 1–80 $\mu$m.

13. Process according to claim 12, wherein the particles have an average size of about 5–60 $\mu$m.

14. Process according to claim 1 or 2, wherein the particle coated paper is a decor sheet and said sheet is also coated with pulverized alpha-cellulose impregnated with melamine resin.

15. Process according to claim 1 or 2, wherein two particle coated surface sheets are used.

16. Process according to claim 1 or 2, wherein the particle coated side of the paper is directed towards the upper side of the laminate.

17. Process according to claim 1 or 2, wherein the dry, hard particles are applied by means of a device comprising a container containing the hard particles and a rotating doctor-roll with an uneven surface placed under the container, whereby the particles are intended to fall down from the container to the doctor-roll and then be evenly distributed on a paper web continuously fed under the doctor-roll, said paper web being impregnated with a thermosetting resin but not dried before the application of the particles.

18. Process according to claim 17, wherein the device used also comprises a scraper plate under the container, which plate is intended to give an even feeding of the particles along the surface of the doctor-roll.

19. Process according to claim 17, wherein the device used comprises an air knife intended to get the particles to come loose from the doctor-roll at a constant amount per unit of time.

20. Process according to claim 1, wherein the hard particles are applied by electrostatic coating.

21. Process according to claim 1, wherein the hard particles are charged by means of friction and then applied to the paper web.

* * * * *

UNITED STATES PATENT AND TRADEMARK OFFICE
CERTIFICATE OF CORRECTION

PATENT NO. : 4,940,503

DATED : July 10, 1990

INVENTOR(S) : LINDGREN et al.

It is certified that error appears in the above-identified patent and that said Letters Patent is hereby corrected as shown below:

ON THE TITLE PAGE:

"[73] Assignee: Prestorp" change to --Perstorp--.

"[56] References Cited change "4,263,031" to --

4,263,081

Signed and Sealed this

Eighth Day of October, 1991

Attest:

HARRY F. MANBECK, JR.

*Attesting Officer*     *Commissioner of Patents and Trademarks*

REEXAMINATION CERTIFICATE (3667th)

United States Patent [19]
Lindgren et al.

[11] B1 4,940,503
[45] Certificate Issued Nov. 10, 1998

[54] PROCESS FOR THE PRODUCTION OF AN ABRASION RESISTANT DECORATIVE THERMOSETTING LAMINATE

[75] Inventors: Kent O. Lindgren; Sven E. Danielsson; Tommy M. Johnsson, all of Perstorp; Nils-Joel A. Nilsson, Hässleholm, all of Sweden

[73] Assignee: Perstorp AB, Perstorp, Sweden

Reexamination Requests:
No. 90/004,282, Jun. 21, 1996
No. 90/004,295, Jul. 3, 1996
No. 90/004,530, Jan. 24, 1997

Reexamination Certificate for:
Patent No.: 4,940,503
Issued: Jul. 10, 1990
Appl. No.: 311,955
Filed: Feb. 17, 1989

Certificate of Correction issued Oct. 8, 1991.

[30] Foreign Application Priority Data

Feb. 18, 1988 [SE] Sweden ............................ 8800550

[51] Int. Cl.$^6$ .................................................. B32B 31/12
[52] U.S. Cl. .................. 156/279; 156/278; 156/324; 156/335; 156/390; 162/184; 427/180; 427/202; 427/204; 427/205; 428/208; 428/904.4; 428/908.8
[58] Field of Search ...................... 118/308; 156/62.2, 156/279, 278, 390, 324, 335, 264, 265; 428/535, 904.4, 908.8, 329, 208; 427/180, 202, 204, 205; 162/184, 186

[56] References Cited

U.S. PATENT DOCUMENTS

| | | |
|---|---|---|
| Re. 30,233 | 3/1980 | Lane et al. |
| Re. 31,373 | 9/1983 | Ungar et al. |
| Re. 32,152 | 5/1986 | Scher et al. |
| 858,508 | 7/1907 | Goldman .......................... 118/308 |
| 1,592,957 | 7/1926 | Nickel ............................. 118/308 |
| 2,057,548 | 10/1936 | Wallach et al. |
| 2,768,923 | 10/1956 | Kepple et al. |
| 3,121,642 | 2/1964 | Biskup ............................ 427/205 |
| 3,135,643 | 6/1964 | Michl ............................. 156/278 |
| 3,373,070 | 3/1968 | Fuerst . |

(List continued on next page.)

FOREIGN PATENT DOCUMENTS

| | | |
|---|---|---|
| 454328 | 1/1943 | Canada . |
| 818445 | 7/1969 | Canada . |
| 990632 | 8/1976 | Canada . |
| 2107091 | 9/1973 | Germany . |
| 2124432 | 1/1976 | Germany . |
| 1348272 | 3/1974 | United Kingdom . |
| WO 86/00829 | 2/1986 | WIPO . |

OTHER PUBLICATIONS

Pulp and Paper Chemistry Chemistry and Chemical Technology, Third Edition, vol. IV, pp. 2438–2439, 1983.

"Bonding, Coating, and Laminating Nonwoven Fabrics" by Francis A. Woodruff, Published by Modern Nonwovens Technology in 1977.

Modern Nonwoven Technology, D.T.Ward; Bonding, Coating and Laminating Nonwoven Fabrics by Francis A. Woodruff.

"Beschichtungs–und Kachieranlagen" from Villars.
"Maschinebau" from Villars.
"Lokalanzelger Wahlen Extra" from Villars, Aug. 24, 1987.

*Primary Examiner*—Richard Crispino

[57] ABSTRACT

This invention relates to a process for the production of a decorative thermosetting laminate with an abrasion-resistant surface layer, which laminate comprises paper sheets impregnated with a thermosetting resin. In the process a continuous paper is impregnated with a noble thermosetting resin such as melamine-formaldehyde resin. At least one side of the paper is coated with 2–20 g/m$^2$, preferably 3–12 g/m$^2$ of small, dry and hard particles evenly distributed over the whole wet surface of the resin on the continuous paper. The resin is dried, whereupon the particle coated impregnated paper, so-called prepreg is possibly cut to sheets. At least one such sheet or continuous paper is placed as a surface layer on a base layer and bonded thereto.

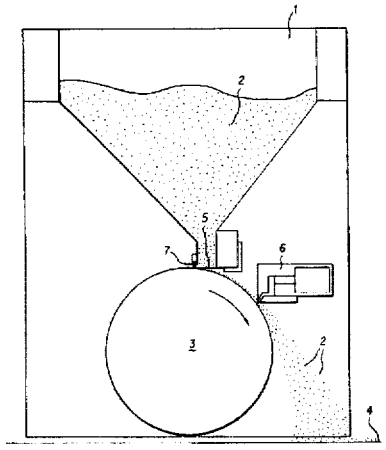

U.S. PATENT DOCUMENTS

| | | |
|---|---|---|
| 3,373,071 | 3/1968 | Fuerst . |
| 3,461,032 | 8/1969 | Lichtenberger et al. . |
| 3,532,587 | 10/1970 | Ungar et al. . |
| 3,661,673 | 5/1972 | Merriam . |
| 3,674,619 | 7/1972 | Scher et al. . |
| 3,723,220 | 3/1973 | Scher et al. . |
| 3,732,137 | 5/1973 | Scher et al. . |
| 3,761,338 | 9/1973 | Ungar et al. . |
| 3,798,111 | 3/1974 | Lane et al. . |
| 3,814,647 | 6/1974 | Scher et al. . |
| 3,928,527 | 12/1975 | Wohnhaas et al. . |
| 3,928,706 | 12/1975 | Gibbons . |
| 3,968,291 | 7/1976 | Chevallier . |
| 4,092,198 | 5/1978 | Scher et al. . |
| 4,092,199 | 5/1978 | Ungar et al. . |
| 4,093,766 | 6/1978 | Scher et al. . |
| 4,154,882 | 5/1979 | Ungar et al. . |
| 4,255,480 | 3/1981 | Scher et al. ............................ 156/222 |
| 4,263,081 | 4/1981 | Scher et al. . |
| 4,305,987 | 12/1981 | Scher et al. . |
| 4,327,141 | 4/1982 | Scher et al. . |
| 4,395,452 | 7/1983 | Scher et al. . |
| 4,400,423 | 8/1983 | Scher et al. . |
| 4,406,456 | 9/1983 | Berry et al. ............................. 156/94 |
| 4,430,375 | 2/1984 | Scher et al. . |
| 4,473,613 | 9/1984 | Jaisle et al. . |
| 4,499,137 | 2/1985 | O'Dell et al. . |
| 4,517,235 | 5/1985 | Ungar et al. . |
| 4,520,062 | 5/1985 | Ungar et al. . |
| 4,532,170 | 7/1985 | O'Dell et al. . |
| 4,555,292 | 11/1985 | Thompson ............................ 156/279 |
| 4,567,087 | 1/1986 | O'Dell et al. . |
| 4,713,138 | 12/1987 | Ungar et al. . |
| 4,724,187 | 2/1988 | Ungar et al. . |
| 4,741,946 | 5/1988 | Ungar et al. . |
| 4,784,908 | 11/1988 | Ungar et al. . |
| 4,971,855 | 11/1990 | Lex et al. . |
| 5,037,694 | 8/1991 | Ungar et al. . |
| 5,093,185 | 3/1992 | Ungar et al. . |
| 5,275,876 | 1/1994 | O'Dell et al. . |

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 20 and 21 are cancelled.

Claims 1, 2, 15 and 17 are determined to be patentable as amended.

Claims 3-14, 16, 18 and 19, dependent on an amended claim, are determined to be patentable.

New claims 22-35 are added and determined to be patentable.

1. Process for the production of a decorative thermosetting *flooring* laminate with *a surface layer having* an abrasion[-resistant surface layer] *resistance of at least 2000 revolutions calculated as IP-value*, said laminate comprising paper sheets impregnated with a thermosetting resin, said process comprising impregnating a continuous paper *web* with a thermosetting resin, and having the surface of the paper wetted with said resin, coating at least one side of the continuous paper with 2-20 g/m² of small, dry and hard particles [so that said particles are] *by means of a device comprising a container containing the hard particles and a rotating doctor-roll with an uneven surface placed under the container, whereby the particles are intended to fall down from the container to the doctor-roll and then be* evenly distributed over the surface of resin on the [continuous] paper *web continuously fed under the doctor-roll*, then drying the resin with the [particle] *particles* coated thereon, cutting the particle coated impregnated paper into sheets, placing at least one such paper sheet as a surface layer on a base layer and bonding the surface layer to the base layer.

2. Process for the production of a decorative thermosetting *flooring* laminate with an abrasion[-resistant surface] *resistance of at least 2000 revolutions calculated as IP-value*, said laminate comprising paper sheets impregnated with a thermosetting resin, said process comprising impregnating a continuous paper *web* with a thermosetting resin, and [leaving] *having* the surface of the paper wetted with said resin, coating at least one side of the [continuous] paper *web* with 2-20 g/m² of small, dry and hard particles [so that said particles are] *by means of a device comprising a container containing the hard particles and a rotating doctor-roll with an uneven surface placed under the container, whereby the particles are intended to fall down from the container to the doctor-roll and then be* evenly distributed over the surface of resin on the [continuous] paper *web continuously fed under the doctor-roll*, then drying the resin with the particles coated thereon, placing at least one such continuous paper *sheet* as a surface layer on a base layer and bonding the surface layer to the base layer.

15. Process [according to claim 1 or 2, wherein] *for the production of a decorative thermosetting laminate with an abrasion-resistant surface layer, said laminate comprising* paper sheets impregnated with a thermosetting resin, said process comprising impregnating a continuous paper with a thermosetting resin, and having the surface of the paper wetted with said resin, coating at least one side of the continuous paper with 2-20 g/m² of small, dry and hard particles so that said particles are evenly distributed over the surface of resin on the continuous paper, then drying the resin with the particles coated thereon, cutting the particle coated impregnated paper into sheets, placing two such particle coated [surface] *paper* sheets [are used] *as a surface layer on a base layer and bonding the surface layer to the base layer*.

17. Process [according to claim 1 or 2] *for the production of a decorative thermosetting laminate with an abrasion-resistant surface layer, said laminate comprising paper sheets impregnated with a thermosetting resin, said process comprising impregnating a continuous paper with a thermosetting resin, and having a surface of the paper wetted with said resin, coating at least one side of the continuous paper with 2-20 g/m² of small, dry and hard particles so that said particles are evenly distributed over the surface of resin on the continuous paper, then drying the resin with the particles coated thereon, cutting the particle coated impregnated paper into sheets, placing at least one such paper sheet as a surface layer on a base layer and bonding the surface layer to the base layer, wherein the dry, hard* particles are applied by means of a device comprising a container containing the hard particles and a rotating doctor-roll with an uneven surface placed under the container, whereby the particles are intended to fall down from the container to the doctor-roll and then be evenly distributed on a paper web continuously fed under the doctor-roll, said paper web being impregnated with a thermosetting resin but not dried before the application of the particles.

22. *Process according to claim 1 or 2, wherein the surface layer has an abrasion resistance of at least 2500 revolutions calculated as IP-value.*

23. *Process according to claim 1 or 2, wherein the surface layer has an abrasion resistance of at least 3000 revolutions calculated as IP-value.*

24. *Process according to claim 1 or 2, wherein two particle coated surface sheets are used.*

25. *The process of claim 15 wherein said two particle coated sheets comprise an upper sheet and a lower sheet, and the particle coated side of the upper sheet is directed towards the lower sheet.*

26. *The process of claim 25 wherein said two particle coated sheets comprise an upper overlay sheet and a lower overlay sheet which are each positioned over a decor layer and the particle coated side of the upper overlay sheet is directed towards the lower overlay sheet.*

27. *Process for the production of a decorative thermosetting laminate with an abrasion-resistant surface, said laminate comprising paper sheets impregnated with a thermosetting resin, said process comprising impregnating a continuous paper with a thermosetting resin and having the surface of the paper wetted with said resin, coating at least one side of the continuous paper with 2-20 g/m² of small, dry and hard particles so that said particles are evenly distributed over the surface of resin on the continuous paper, then drying the resin with the particles coated thereon, placing at least one such continuous paper sheet as a surface layer on a base layer and bonding the surface layer to the base layer, wherein the dry, hard particles are applied by means of a device comprising a container containing the hard particles and a rotating doctor-roll with an uneven surface placed under the container, whereby the particles* are intended to fall down from the container to the doctor-roll and then be evenly distributed on a paper web continuously fed under the doctor-roll, said paper web being impregnated with a thermosetting resin but not dried before the application of particles.

28. Process according to claim 27, wherein the device used also comprises a scraper plate under the container, which plate is intended to give an even feeding of the particles along the surface of the doctor-roll.

29. Process according to claim 27, wherein the device used comprises an air knife intended to get the particles to come loose from the doctor-roll at a constant amount per unit of time.

30. Process for the production of a decorative thermosetting flooring laminate with an abrasion-resistant surface layer, said surface layer comprising a decor sheet and at least one overlay paper placed on top of the decor sheet, said laminate comprising paper sheets impregnated with a thermosetting resin, said process comprising impregnating a continuous paper with a thermosetting resin, and having a surface of the paper wetted with said resin, coating at least one side of the continuous paper with 2–20 g/m² of small, dry and hard particles so that said particles are evenly distributed over the surface of resin on the continuous paper, then drying the resin with the particles coated thereon, cutting the particle coated impregnated paper into sheets, and placing said surface layer on a base layer with the decor sheet adjacent the base layer and bonding the surface layer to the base layer, wherein said continuous paper is the decor sheet which has the particles coated on the decor side.

31. The process of claim 30 wherein said overlay paper is also continuous paper impregnated in the same way as the decor sheet and coated, at least on one side thereof, with 2–20 g/m² of small, dry, hard particles so that the particles are evenly distributed over the surface of said overlay paper.

32. The process of claim 31 wherein said particle coated side of the overlay paper is directed towards the decor sheet.

33. Process for the production of a decorative thermosetting flooring laminate with an abrasion-resistant surface layer, said surface layer comprising a decor sheet and at least one overlay paper placed on top of the decor sheet, said laminate comprising paper sheets impregnated with a thermosetting resin, said process comprising impregnating a continuous paper with a thermosetting resin, and having a surface of the paper wetted with said resin, coating at least one side of the continuous paper with 2–20 g/m² of small, dry and hard particles so that said particles are evenly distributed over the surface of resin on the continuous paper, then drying the resin with the particles coated thereon, and placing said surface layer on a base layer with the decor sheet adjacent the base layer and bonding the surface layer to the base layer, wherein said continuous paper is the decor sheet which has the particles coated on the decor side.

34. The process of claim 33 wherein said overlay paper is also continuous paper impregnated in the same way as the decor sheet and coated, at least on one side thereof, with 2–20 g/m² of small, dry, hard particles so that the particles are evenly distributed over the surface of said overlay paper.

35. The process of claim 34 wherein said particle coated side of the overlay sheet is directed towards the decor sheet.

* * * * *